United States Patent
Takahashi (10) Patent No.: US 7,584,388 B2
(45) Date of Patent: Sep. 1, 2009

(54) ERROR NOTIFICATION METHOD AND INFORMATION PROCESSING APPARATUS

(75) Inventor: Jin Takahashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 273 days.

(21) Appl. No.: 11/182,848

(22) Filed: Jul. 18, 2005

(65) Prior Publication Data

US 2006/0212763 A1    Sep. 21, 2006

(30) Foreign Application Priority Data

Mar. 17, 2005  (JP)  ............................ 2005-078013

(51) Int. Cl.
*G06F 11/00*    (2006.01)
(52) U.S. Cl. .............................. 714/48; 714/11; 714/12
(58) Field of Classification Search .................... 714/11, 714/12, 13, 48
See application file for complete search history.

(56) References Cited

U.S. PATENT DOCUMENTS

| | | | |
|---|---|---|---|
| 5,914,874 A | | 6/1999 | Nohara |
| 5,915,082 A * | | 6/1999 | Marshall et al. ................ 714/11 |
| 6,622,260 B1 * | | 9/2003 | Marisetty et al. ............... 714/10 |
| 6,948,092 B2 * | | 9/2005 | Kondo et al. ................... 714/12 |
| 2002/0029358 A1 | | 3/2002 | Pawlowski |
| 2004/0078732 A1 | | 4/2004 | Meaney |
| 2004/0123201 A1 * | | 6/2004 | Nguyen et al. ............... 714/736 |
| 2005/0246581 A1 * | | 11/2005 | Jardine et al. ................ 714/12 |
| 2006/0107107 A1 * | | 5/2006 | Michaelis et al. ............. 714/11 |
| 2006/0112308 A1 * | | 5/2006 | Crawford et al. ............... 714/12 |

FOREIGN PATENT DOCUMENTS

| | | |
|---|---|---|
| EP | 0 415 547 A2 | 7/1990 |
| EP | 0 479 230 A2 | 10/1991 |
| JP | 06-095902 | 4/1994 |
| JP | 07-129425 | 5/1995 |
| JP | 08-286779 | 1/1996 |
| JP | 2000-276364 | 10/2000 |

OTHER PUBLICATIONS

European Search Report issued on Feb. 2, 2009 in corresponding European Patent Application 05254461.6.
Japanese Office Action issued in Japanese Application No. 2005-078013 dated May 12, 2009.

* cited by examiner

*Primary Examiner*—Joshua A Lohn
(74) *Attorney, Agent, or Firm*—Staas & Halsey LLP (57) ABSTRACT

An error notification method notifies errors generated in first and second processor systems to each processor within the first and second processor systems, in a computer system that includes the first processor system operable in a normal mode and the second processor system operable together with the first processor system in a mirror mode. The error notification method generates an error interrupt signal that indicates each error by a corresponding one of a plurality of error levels, reduces the error level of a corresponding error interrupt signal when the error within the first processor system is avoided in the mirror mode, and notifies the error to each processor within the first and second processor systems using the error interrupt signal.

17 Claims, 7 Drawing Sheets

ERROR NOTIFICATION METHOD AND INFORMATION PROCESSING APPARATUS

BACKGROUND OF THE INVENTION

1. Field of the Invention

The present invention generally relates to error notification methods and information processing apparatuses, and more particularly to an error notification method for an information processing apparatus that can carry out a mirror operation, and to an information processing apparatus that employs such an error notification method.

2. Description of the Related Art

When an error is generated in an information processing apparatus such as a computer system, a circuit that detects the error notifies the error to a processor such as a CPU within the computer system by use of an interrupt signal corresponding to an error level (or error intensity). A software for carrying out the error process of the processor, that is, an error process handler, judges whether to shut down the computer system or to permit continued operation of the computer system, depending on the error level of the error that is notified by the interrupt signal. Accordingly, the computer system is shut down if the error level is high, and the continued operation of the computer system is permitted if the error level is low. Normally, the specifications of the error process handler are determined by a manufacturer of the processor, and the error process handler has a structure such that the software thereof cannot be modified.

On the other hand, in the case of a computer system that is made up of a plurality of processor systems, the interrupt signal described above is notified to all of the processor systems within the computer system. In addition, in the case of such a computer system, the reliability of the computer system is improved by carrying out a mirror operation with respect to memory systems of the processor systems. The mirror operation is sometimes also referred to as mirroring. In the case of the mirroring, 2 processor systems carry out the same process, and the reliability of the processed result is improved by comparing and checking the processed results of the 2 processor systems.

Figure 1:
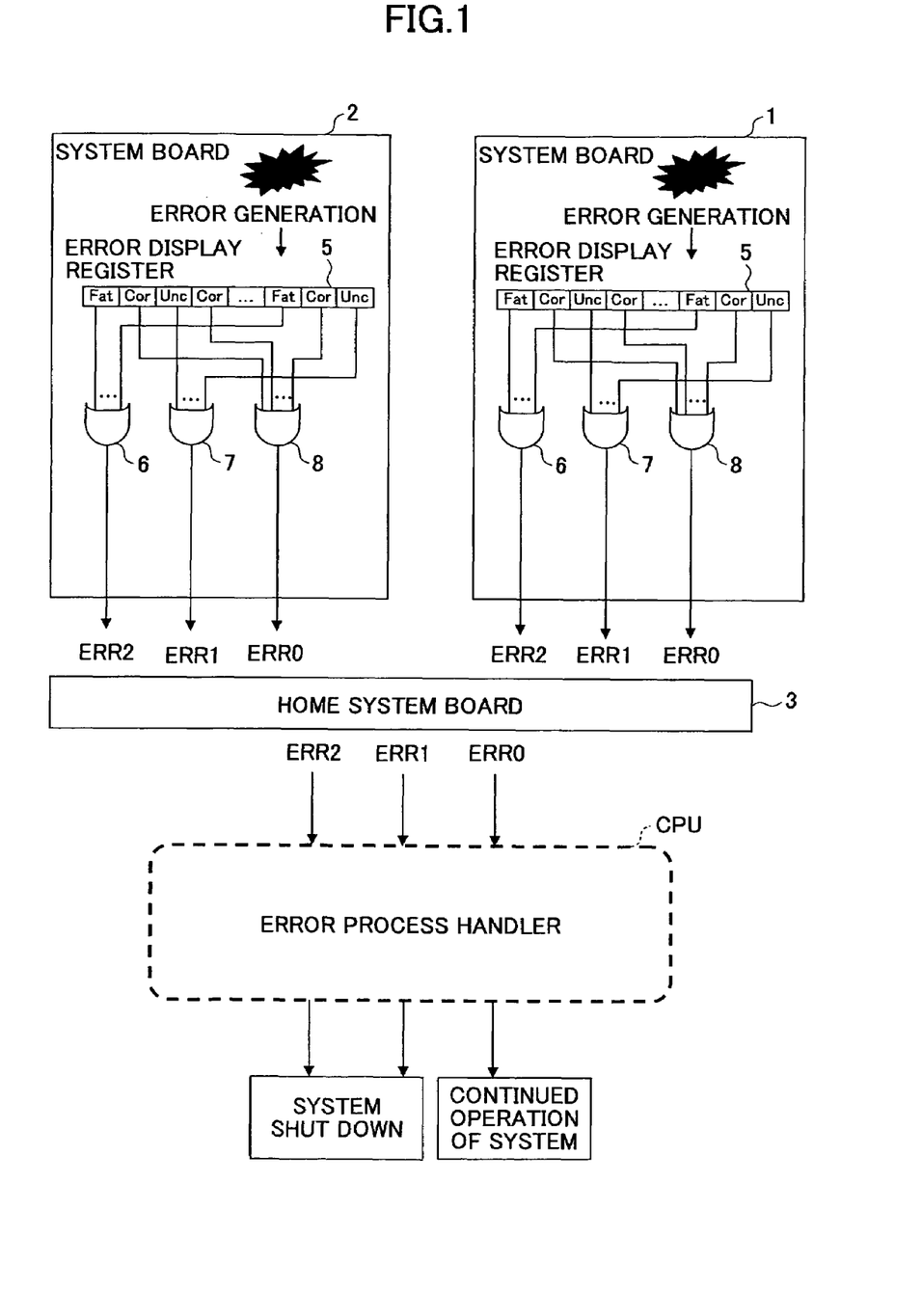
FIG. 1 is a diagram for explaining an example of a conventional error notification method.

FIG. 1 is a diagram for explaining an example of a conventional error notification method. The computer system includes a system board 1 that is used in a normal mode, a system board 2 that is used together with the system board 1 in a mirror mode, and a home system board 3 that processes errors detected by the system boards 1 and 2. Each of the system boards 1 and 2 includes one or a plurality of CPUs (not shown) and the like, to form a processor system. Each of the system boards 1 and 2 includes an error display register 5, and OR circuits 6 through 8. The error display register 5 includes register parts corresponding to portions where the error is generated, and each of the register parts stores an error level. It is assumed for the sake of convenience that the error level includes a fatal error level Fat, an uncorrectable error level Un, and a correctable error level Cor. The values of the error levels Fat, Un and Cor satisfy a relationship Fat>Un>Cor. An output of the register part that stores the fatal error level Fat is output via an OR circuit 6 as an error interrupt signal ERR2. An output of the register part that stores the uncorrectable error level Un is output via an OR circuit 7 as an error interrupt signal ERR1. In addition, an output of the register part that stores the correctable error level Cor is output via an OR circuit 8 as an error interrupt signal ERR0. The home system board 3 includes circuits for determining partitions of the computer system, and for notifying the error interrupt signals ERR2, ERR1 and ERR0 to each CPU within the computer system.

The error process handler of each CPU within the computer system shuts down the computer system when an error notification by the error interrupt signal ERR2 or ERR1 is received. In addition, the error process handler of each CPU within the computer system permits continued operation of the computer system when an error notification by the error interrupt signal ERR0 is received, because the correctable error Cor is correctable by ECC and the like.

For example, a Japanese Laid-Open Patent Application No. 2000-276364 proposes a fault restoration operation depending on an address index and/or a fault source index.

In the case of the mirror mode, the system board 2 may be able to avoid the error by the mirroring, even when the error interrupt signal ERR2 or ERR1 having the high error level is output from the system board 1. In other words, the error interrupt signal ERR0 having the low error level may be output or, no error interrupt signal may be output, from the system board 2. However, the error process handler of each CPU within the computer system normally cannot be modified, as described above. For this reason, when the home system board 3 receives the error notification having the high error level from the system board 1, an error notification having the higher error level is made with respect to each CPU, similarly as in the case of the normal mode, even if only the error notification having the low error level or no error notification is received from the system board 2, and there was a problem in that the computer system will be shut down.

It is conceivable to switch, in the mirror mode, the error process handler to an error process handler exclusively for the mirror mode. But this conceivable method is undesirable in that it would be necessary to modify the software design of the CPU.

SUMMARY OF THE INVENTION

Accordingly, it is a general object of the present invention to provide a novel and useful error notification method and information processing apparatus, in which the problems described above are suppressed.

Another and more specific object of the present invention is to provide an error notification method and an information processing apparatus, which can make an optimum error notification in both a normal mode and a mirror mode.

Still another object of the present invention is to provide an error notification method for notifying errors generated in first and second processor systems to each processor within the first and second processor systems, in a computer system that includes the first processor system operable in a normal mode and the second processor system operable together with the first processor system in a mirror mode, the error notification method comprising generating an error interrupt signal that indicates each error by a corresponding one of a plurality of error levels; reducing the error level of a corresponding error interrupt signal when the error within the first processor system is avoided in the mirror mode; and notifying the error to each processor within the first and second processor systems using the error interrupt signal. According to the error notification method of the present invention, it is possible to make an optimum error notification in both the normal mode and the mirror mode.

A further object of the present invention is to provide an information processing apparatus comprising a first processor system operable in a normal mode; a second processor system operable together with the first processor system in a mirror mode, each of the first and second processor systems comprising a storage part configured to store an internally generated error by a corresponding one of a plurality of error levels; a first circuit configured to generate an error interrupt signal having a corresponding error level based on an output of the storage part; a second circuit configured to reduce the error level of a corresponding error interrupt signal if the error within the first processor system is avoided in the mirror mode; and a third circuit configured to notify the error to each processor within the first and second processor systems using the error interrupt signal. According to the information processing apparatus of the present invention, it is possible to make an optimum error notification in both the normal mode and the mirror mode.

Other objects and further features of the present invention will be apparent from the following detailed description when read in conjunction with the accompanying drawings.

DESCRIPTION OF THE PREFERRED EMBODIMENTS

A description will be given of embodiments of an error notification method and an information processing apparatus according to the present invention, by referring to FIG. 2 and the subsequent drawings.

Figure 2:
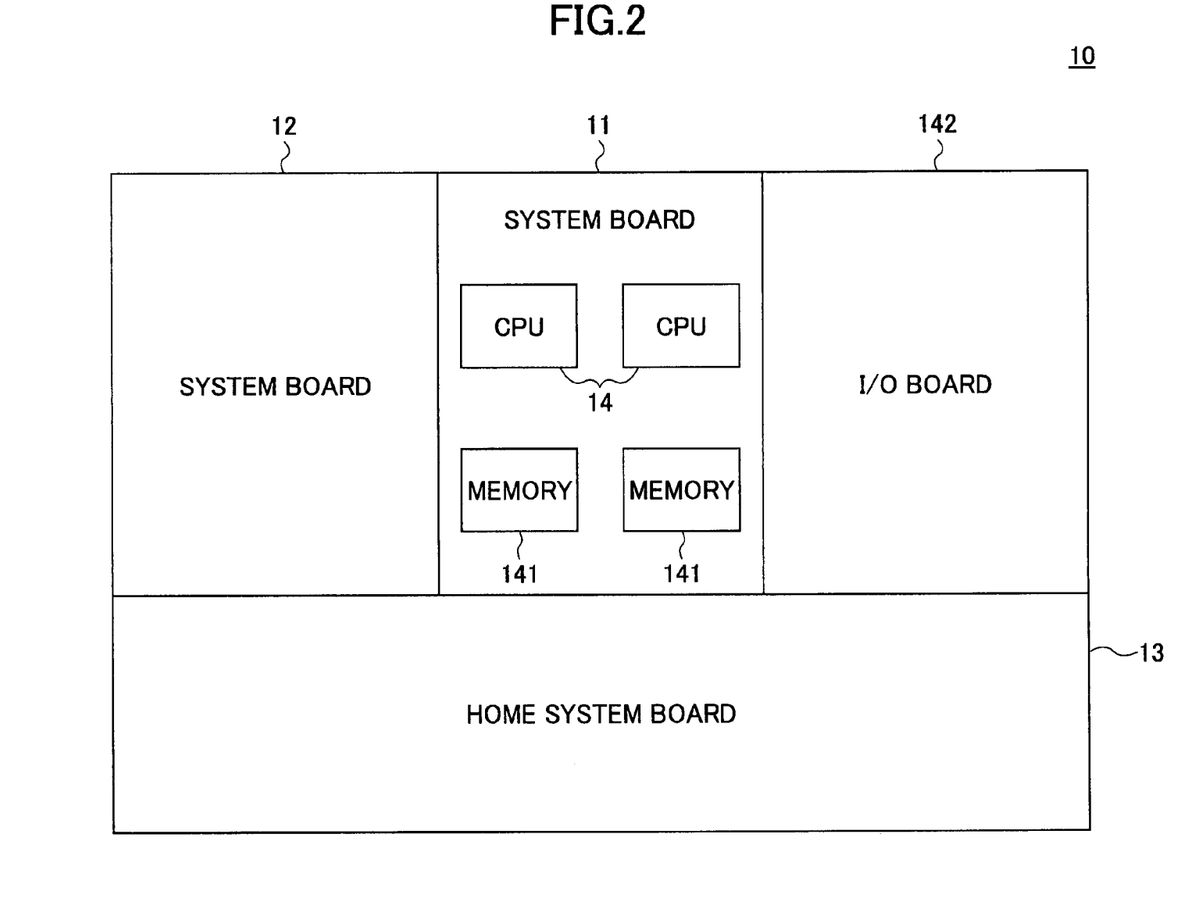
FIG. 2 is a system block diagram showing a general structure of an information processing apparatus according to the present invention.

FIG. 2 is a system block diagram showing a general structure of the information processing apparatus according to the present invention. An embodiment of the information processing apparatus according to the present invention employs an embodiment of the error notification method according to the present invention. In this embodiment, the present invention is applied to a computer system shown in FIG. 2.

A computer system 10 shown in FIG. 2 includes a system board 11 that is used in a normal mode, a system board 12 that is used together with the system board 11 in a mirror mode, an input and output (I/O) board 142 having a plurality of input and output (I/O) ports, and a home system board 13 that processes errors detected in the system boards 11 and 12. In other words, the system board 11 is operable in the normal mode, and the system board 12 is operable together with the system board 11 in the mirror mode. The system board 11 includes a plurality of CPUs 14 and a plurality of memories 141. The system board 12 has a structure similar to that of the system board 11. In addition, the home system board 13 may also have a structure similar to that of the system board 11. The system boards 11, 12 and 13 form a processor system.

Figure 3:
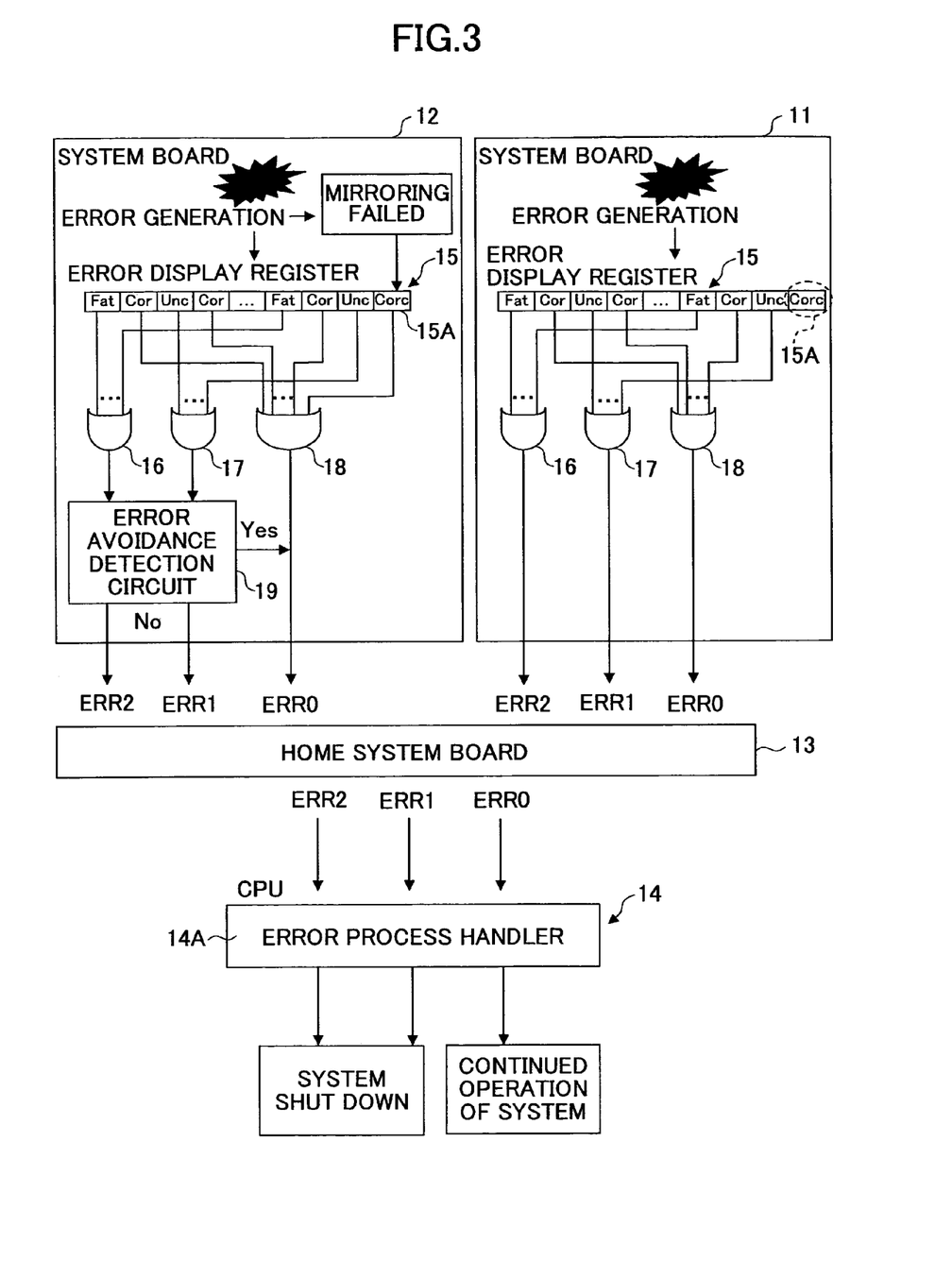
FIG. 3 is a system block diagram showing an important part of an embodiment of the information processing apparatus according to the present invention.

FIG. 3 is a system block diagram showing an important part of this embodiment of the information processing apparatus according to the present invention. Each of the system boards 11 and 12 includes an error display register 15, and OR circuits 16 through 18, as shown in FIG. 3. The system board 12 further includes an error avoidance detection circuit 19 which will be described later.

The error display register 15 has register parts corresponding to portions where the error is generated, and the error level is stored in each register part. It is assumed for the sake of convenience that that the error level includes a fatal error level Fat, an uncorrectable error level Un, and a correctable error level Cor. The values of the error levels Fat, Un and Cor satisfy a relationship Fat>Un>Cor. An output of the register part that stores the fatal error level Fat is output via an OR circuit 16 as an error interrupt signal ERR2. An output of the register part that stores the uncorrectable error level Un is output via an OR circuit 17 as an error interrupt signal ERR1. In addition, an output of the register part that stores the correctable error level Cor is output via an OR circuit 18 as an error interrupt signal ERR0. The error display register 15 further includes a register part 15A that is used during a mirror mode which will be described later. The register part 15A of the error display register 15 within the system board 11 may be omitted. The home system board 13 includes circuits for determining partitions of the computer system 10, and for notifying the error interrupt signals ERR2, ERR1 and ERR0 to each CPU 4 within the computer system 10.

The error avoidance detection circuit 19 has a function of reducing the error level of the corresponding error interrupt signal to an error level that permits the continued operation of the computer system 10 if the error within the system board 11 can be avoided in a mirror mode. More particularly, the error avoidance detection circuit 19 outputs the error interrupt signal ERR2 or ERR1 to the home system board 13 as the error interrupt signal ERR0, if the error avoidance detection circuit 19 detects that the error in the system board 11 indicated by the error interrupt signal ERR2 or ERR1 (that is, having the fatal error level Fat or the uncorrectable error level Un) can be avoided by the mirroring of the system board 12.

An error process handler 14A of each CPU 14 within the computer system 10 shuts down the computer system 10 when an error notification by the error interrupt signal ERR2 or ERR1 is received. In addition, the error process handler 14A of each CPU 14 permits the continued operation of the computer system 10 when an error notification by the error interrupt signal ERR0 is received, because the correctable error Cor is correctable by ECC and the like.

Figure 4:
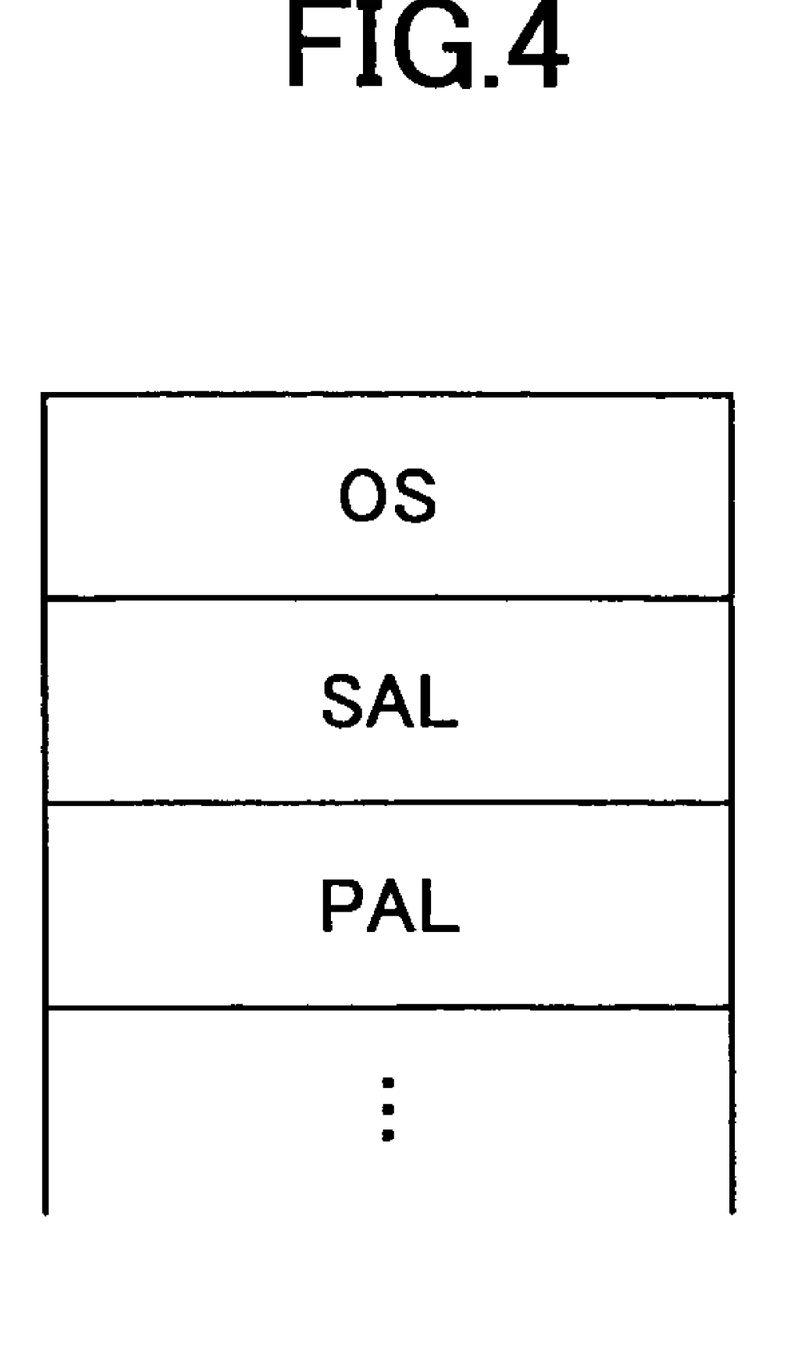
FIG. 4 is a diagram showing a software structure of a CPU.

FIG. 4 is a diagram showing a software structure of the CPU 14. As shown in FIG. 4, the software of the CPU 14 has a hierarchical structure that includes an Operating System (OS) in a highest layer, and a System Abstraction Layer (SAL) and a Basic Input Output System (BIOS), such as a Processor Abstraction Layer (PAL), in layers under the OS. The error process handler 14A described above is included in the SAL.

Figure 5:
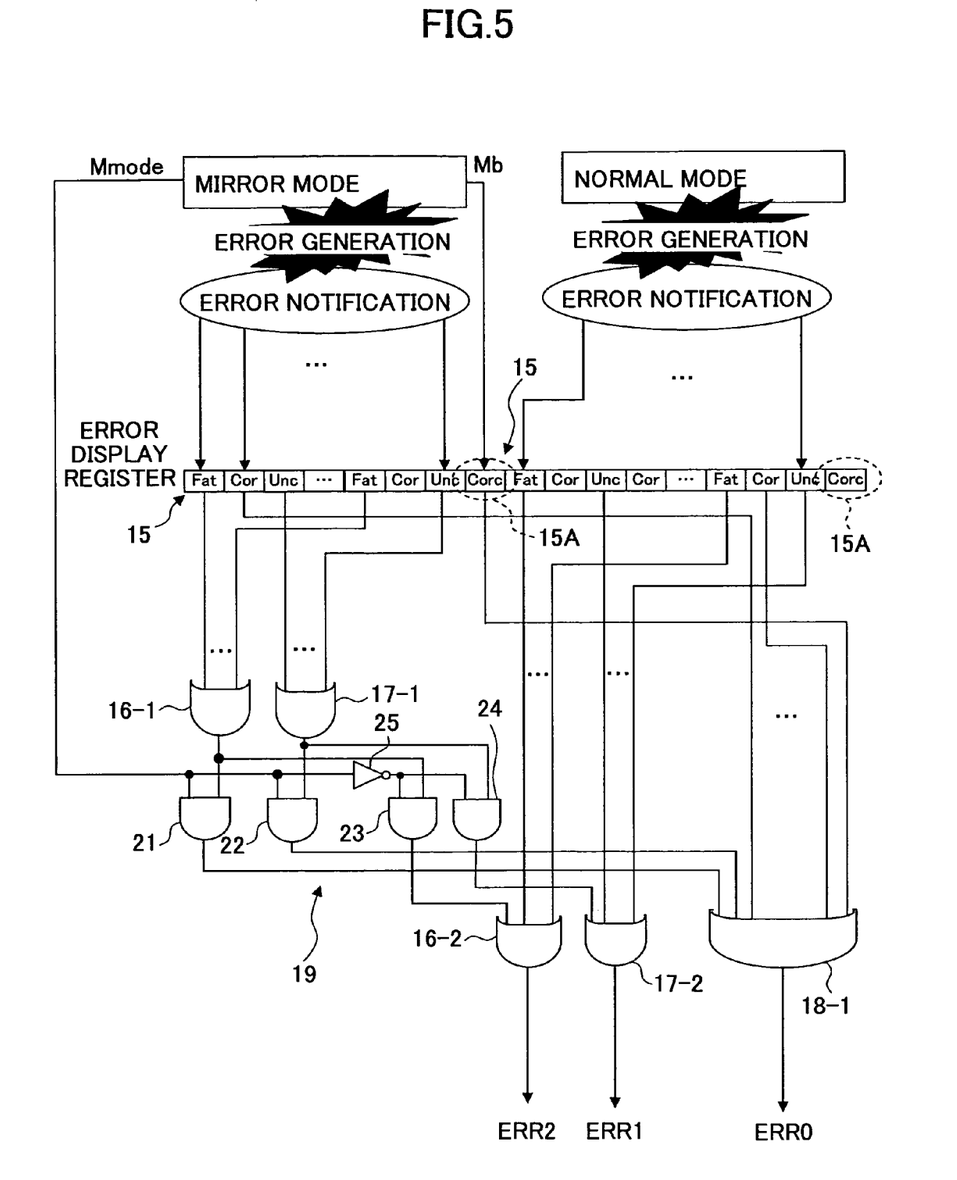
FIG. 5 is a circuit diagram showing an important part of the embodiment of the information processing apparatus.

FIG. 5 is a circuit diagram showing an important part of this embodiment of the information processing apparatus. In FIG. 5, those parts which are the same as those corresponding parts in FIG. 3 are designated by the same reference numerals, and a description thereof will be omitted.

In FIG. 5, OR gates 16-1 and 17-1 respectively correspond to the OR gates 16 and 17 within the system board 12 shown in FIG. 3, OR gates 16-2 and 17-2 respectively correspond to the OR gates 16 and 17 within the system board 11 shown in FIG. 3, and an OR gate 18-1 corresponds to the OR gates 18 within both the system boards 11 and 12. AND gates 21 through 24 and an inverter 25 correspond to the error avoidance detection circuit 19 shown in FIG. 3. A mode signal Mmode that indicates an operation mode of the computer system 10 is input to the error avoidance detection circuit 19 from the CPU 15. For example, the mode signal Mmode has a value "1" during the mirror mode, and has a value "0" during the normal mode. Information Mb indicating that the mirroring in the mirror mode has failed due to the generation of an error is set in the register part 15A of the error display register 15. For example, the information Mb has a value "1" when the mirroring fails, and has a value "0" when the mirroring is maintained. Hence, the mode signal Mmode makes a transition from the value "1" to the value "0" from the next error after the information Mb takes the value "1". In a case where the register part 15A is also provided in the error display register 15 within the system board 11, the information Mb may be set in the register part 15A of the error display register 15 within the system board 11, so that an output of the register part 15A is input to the OR gate 18-1.

In the case of the mirror mode, the system board 12 may be able to avoid the error by the mirroring, even when the error interrupt signal ERR2 or ERR1 having the high error level is output from the system board 11. In other words, the error interrupt signal ERR0 having the low error level may be output from the system board 12. When the error is detected but the error is avoided, a notification is still made by outputting an interrupt signal to indicate the avoidance of the error. However, it is possible to carry out a control so that the error interrupt signal is not output in such a case. For this reason, if the error process handler 14A of each CPU 14 within the computer system 10 were not modified and the error notification from the system board 11 were output as it is to the home system board 13, an error notification having the higher error level would be made with respect to each CPU 14, similarly as in the case of the normal mode, when the home system board 13 receives the error notification having the high error level from the system board 11, even if only the error notification having the low error level were received from the system board 12, thereby causing the computer system 10 to be shut down. But in this embodiment, when the error avoidance detection circuit 19 detects that the error within the system board 11 indicated by the error interrupt signal ERR2 or ERR1 (that is, having the fatal error level Fat or the uncorrectable error level Un) can be avoided by the mirroring in the system board 12, the error avoidance detection circuit 19 outputs the error interrupt signal ERR2 or ERR1 to the home system board 13 as the error interrupt signal ERR0, so as to make an error notification different from that during the normal mode. Accordingly, even when the error is generated, the continued operation of the computer system 10 becomes possible if the mirroring makes it unnecessary to shut down the computer system 10.

Of course, at least a part of the gates 16 through 18 and the error avoidance detection circuit 19 may be provided in the home system board 13.

Figure 6:
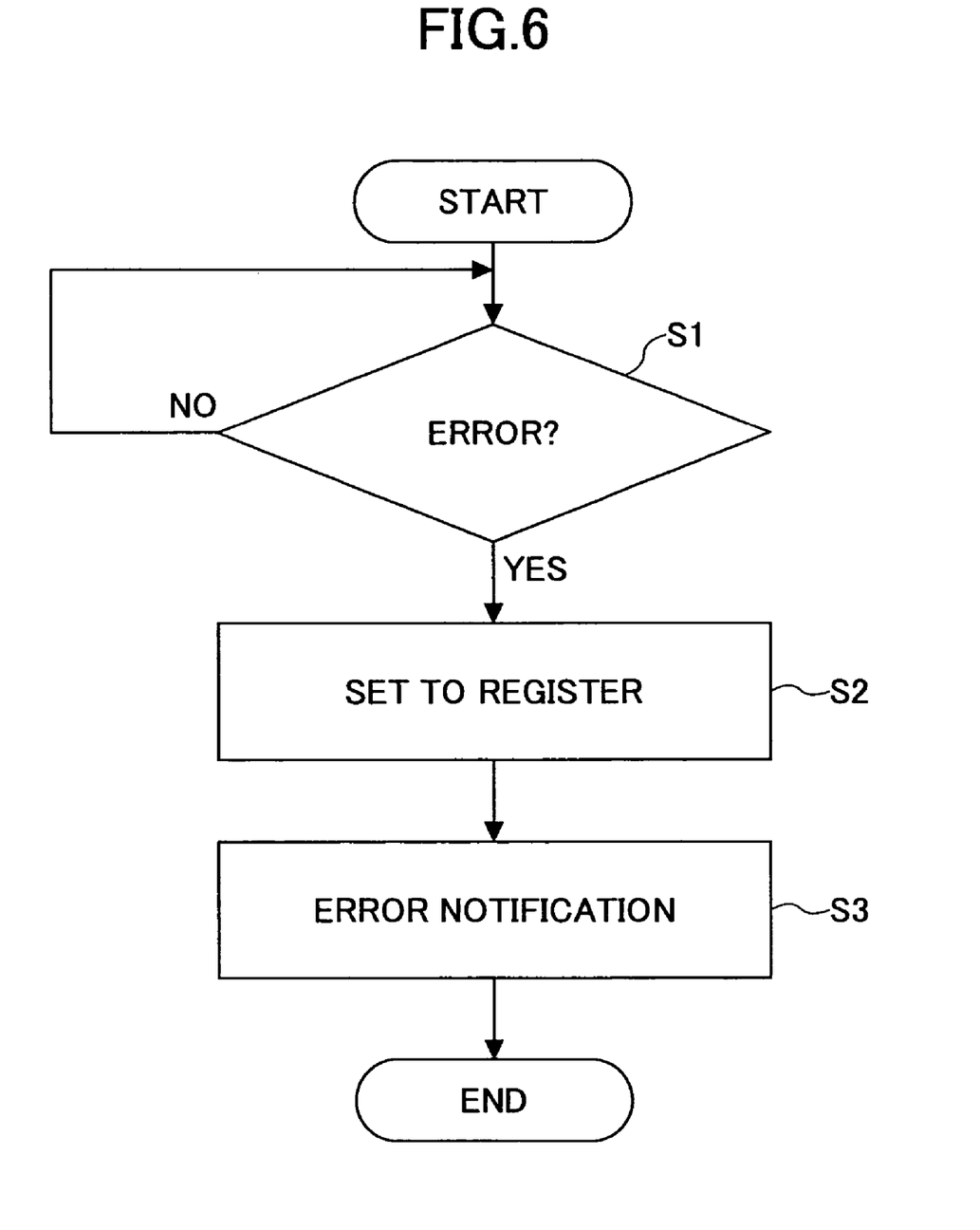
FIG. 6 is a flow chart for explaining a process of a hardware of the information processing apparatus.

FIG. 6 is a flow chart for explaining a process of a hardware (the system boards 11 and 12 and the home system board 13) of the information processing apparatus. In FIG. 6, a step S1 decides whether or not an error is generated. If the decision result in the step S1 is YES, a step S2 sets the detected error level in the register part that is within the error display register 15 and corresponds to the portion where the error is generated. A step S3 makes an error notification by generating an interrupt with respect to the error process handler 14A of the CPU 14 by an error interrupt signal indicating the detected error level, and the process ends.

The mirror mode may be set in units of system boards or, set in units of partitions.

Figure 7:
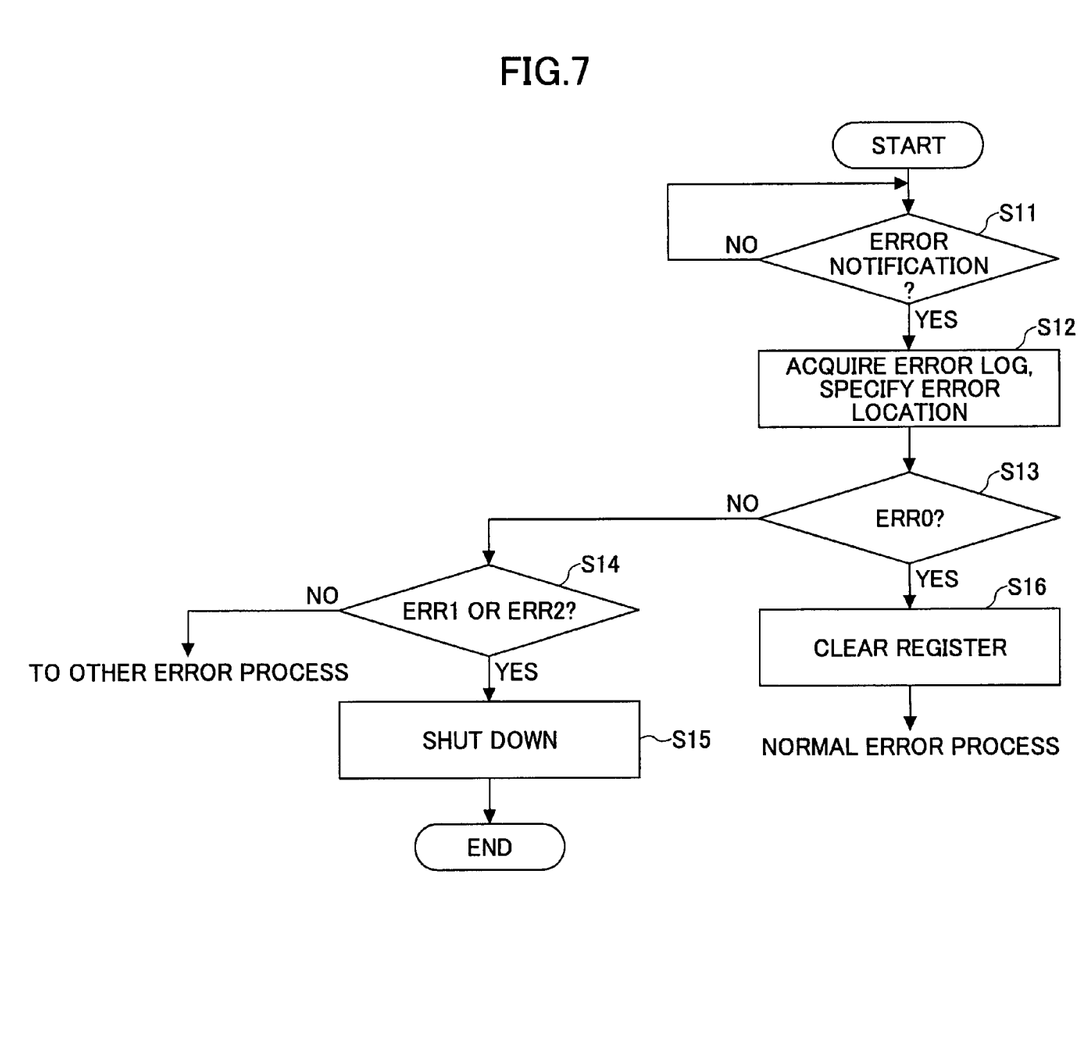
FIG. 7 is a flow chart for explaining a process of a software of the CPU of the information processing apparatus.

FIG. 7 is a flow chart for explaining a process of a software (the error process handler 14A) of the CPU 14 of the information processing apparatus. In FIG. 7, a step S11 decides whether or not an interrupt is generated from the home system board 13 by an error interrupt signal, that is, whether or not an error notification is input. If the decision result in the step S11 is YES, a step S12 acquires an error log and specifies the location of the error, by a known method. A step S13 decides whether or not the error interrupt signal is the error interrupt signal ERR0. If the decision result in the step S13 is NO, a step S14 decides whether or not the error interrupt signal is the error interrupt signal ERR1 or ERR2. If the decision result in the step S14 is NO, the process advances to another error process corresponding to the error interrupt signal. On the other hand, if the decision result in the step S14 is YES, a step S15 shuts down the computer system 10, and the process ends. In addition, if the decision result in the step S13 is YES, a step S16 clears the register part of the error display register 15, and the process advances to a normal error process, so as to correct the error having the correctable error level Cor by a known method.

Therefore, the present invention is suitably applicable to the error notification of the information processing apparatus, such as the computer system, having the normal mode and the mirror mode.

This application claims the benefit of a Japanese Patent Application No. 2005-078013 filed Mar. 17, 2005, in the Japanese Patent Office, the disclosure of which is hereby incorporated by reference.

Further, the present invention is not limited to these embodiments, but various variations and modifications may be made without departing from the scope of the present invention.

What is claimed is:

1. An error notification method in a computer system that includes a first processing system operable in a normal mode and a second processing system operable in a mirror mode, for notifying errors generated in the first and second processor systems to each processor within the first and second processor systems, said error notification method comprising:
    generating an error interrupt signal that indicates each error by a corresponding one of a plurality of error levels;
    reducing the error level of a corresponding error interrupt signal when the error within the first processor system is avoidable in the mirror mode, and outputting an error interrupt signal in which the error level is reduced; and
    notifying the generated error to each processor within the first and second processor systems using the error interrupt signal.

2. The error notification method as claimed in claim 1, wherein the error level is reduced based on the error interrupt signal indicating the error generated in the second processor system if the error is avoided in the mirror mode.

3. The error notification method as claimed in claim 1, wherein the error level of the error interrupt signal is reduced to an error level that permits continued operation of the computer system if the error is avoided in the mirror mode.

4. The error notification method as claimed in claim 1, wherein the generation of the error interrupt signal, the reducing of the error level and the error notification by the error interrupt signal are carried out by a hardware, and the error notification is made with respect to a software of each processor.

5. The error notification method as claimed in claim 4, wherein the software is an error process handler within a System Abstraction Layer (SAL).

6. An information processing apparatus comprising:
    a first processor system operable in a normal mode;

a second processor system operable together with the first processor system in a mirror mode, each of the first and second processor systems comprising a storage part configured to store information indicating an internally generated error by a corresponding one of a plurality of error levels;

a first circuit configured to receive information output from the storage part, and to generate an error interrupt signal having a corresponding error level based on the information output from the storage part;

a second circuit configured to reduce the error level of a corresponding error interrupt signal if the error within the first processor system is avoidable in the mirror mode, and to output an error interrupt signal in which the error level is reduced; and a third circuit configured to notify the generated error to each processor within the first and second processor systems using the error interrupt signal.

7. The information processing apparatus as claimed in claim 6, wherein the second circuit reduces the error level based on the error interrupt signal indicating the error generated in the second processor system if the error is avoided in the mirror mode.

8. The information processing apparatus as claimed in claim 6, wherein the second circuit reduces the error level of the error interrupt signal to an error level that permits continued operation of the information processing apparatus if the error is avoided in the mirror mode.

9. The information processing apparatus as claimed in claim 6, wherein the storage part further stores information indicating that a mirroring in the mirroring mode has failed due to generation of an error.

10. The information processing apparatus as claimed in claim 6, wherein the second circuit reduces the error level of the corresponding error interrupt signal based on the output of the storage part and a mode signal indicating the mirror mode.

11. The information processing apparatus as claimed in claim 6, wherein the third circuit makes the error notification with respect to a software of each processor.

12. The information processing apparatus as claimed in claim 11, wherein the software is an error process handler within a System Abstraction Layer (SAL).

13. The information processing apparatus as claimed in claim 6, wherein the third circuit determines partitions of the information processing apparatus.

14. An information processing apparatus, comprising:
a first system board having a processor and configured to operate in a normal mode, and to output an error interrupt signal when an error is detected, said error interrupt signal output from the first system board indicating a level of the error detected therein;

a second system board having a processor and configured to operate in a mirror mode, and to output an error interrupt signal when an error is detected, said error interrupt signal output from the second system board indicating a level of the error detected therein; and a third system board, coupled to the first and second system boards, and configured to receive the error interrupt signals from the first and second system boards and to notify to each of the processors of the first and second system boards the detected errors corresponding to the error levels that the received error interrupt signals indicate, wherein the second system board further has an error avoidance detection circuit configured to reduce a level of the detected error to an error level in which a continued operation of the information processing apparatus is permitted, and to output an error interrupt signal corresponding to the reduced error level, when it is determined that the error within the first system board is avoidable in the mirror mode.

15. The information processing apparatus as claimed in claim 14, wherein:
the processor of the second system board outputs an indication signal indicating whether the second system board is operating in the mirror mode; and the error avoidance detection circuit receives the indication signal from the processor of the second system board and reduces the error level when the indication signal indicates that the second system board is operating in the mirror mode.

16. The information processing apparatus as claimed in claim 14, wherein each of the first system board and the second system board further has a register configured to store information indicating a detected error and a level of the detected error.

17. The information processing apparatus as claimed in claim 16, wherein:
the register of the second system board has an area that stores information indicating a condition of the mirror mode; and the error avoidance detection circuit reduces the error level in accordance with the information indicating the condition of the mirror mode.

* * * * *